United States Patent
Thieman et al.

(10) Patent No.: US 9,038,703 B2
(45) Date of Patent: May 26, 2015

(54) PRODUCTION OF DIE CAST ROTORS WITH COPPER BARS FOR ELECTRIC MOTORS

(71) Applicant: T.H.T Presses, Inc., Dayton, OH (US)

(72) Inventors: Michael W. Thieman, Dayton, OH (US); Richard J. Kamm, Vandalia, OH (US)

(73) Assignee: T.H.T. Presses, Inc., Dayton, OH (US)

( * ) Notice: Subject to any disclaimer, the term of this patent is extended or adjusted under 35 U.S.C. 154(b) by 199 days.

(21) Appl. No.: 13/573,858

(22) Filed: Oct. 9, 2012

(65) Prior Publication Data

US 2014/0097720 A1    Apr. 10, 2014

(51) Int. Cl.
*B22D 19/00* (2006.01)
*B22D 19/04* (2006.01)
*H02K 15/02* (2006.01)
*H02K 17/16* (2006.01)
*H02K 15/00* (2006.01)

(52) U.S. Cl.
CPC .............. *H02K 15/02* (2013.01); *H02K 17/165* (2013.01); *B22D 19/0054* (2013.01); *H02K 15/0012* (2013.01)

(58) Field of Classification Search
CPC ............... B22B 19/0054; B22B 19/04; H02K 15/0012; H02K 15/02; H02K 17/165
USPC .......... 164/108, 109, 110, 112, 303, 332, 333, 164/334
See application file for complete search history.

(56) References Cited

U.S. PATENT DOCUMENTS

| | | | | |
|---|---|---|---|---|
| 2,065,213 A | * | 12/1936 | Dolan et al. | 164/158 |
| 2,304,067 A | * | 12/1942 | Anderson | 164/493 |
| 2,953,826 A | * | 9/1960 | Larsh | 164/321 |
| 2,996,773 A | * | 8/1961 | Summers | 164/70.1 |
| 3,866,666 A | * | 2/1975 | Wunder | 164/327 |
| 4,131,990 A | | 1/1979 | Roach | |
| 4,886,106 A | * | 12/1989 | Bennett | 164/70.1 |
| 5,185,918 A | | 2/1993 | Shafer, Jr. | |
| 5,332,026 A | | 7/1994 | Thieman et al. | |
| 5,398,404 A | | 3/1995 | Meyer et al. | |
| 6,088,906 A | | 7/2000 | Hsu et al. | |
| 6,345,433 B1 | | 2/2002 | Kliman et al. | |
| 6,408,929 B2 | * | 6/2002 | Choudhury et al. | 164/338.1 |
| 6,877,210 B2 | | 4/2005 | Hsu | |
| 2002/0062941 A1 | * | 5/2002 | Cowie et al. | 164/103 |
| 2010/0243197 A1 | * | 9/2010 | Osborne et al. | 164/520 |
| 2012/0169158 A1 | * | 7/2012 | Buttner et al. | 310/54 |

FOREIGN PATENT DOCUMENTS

CN         201523270 U  *  7/2010  ............... H02K 1/32

* cited by examiner

*Primary Examiner* — Kevin P Kerns
(74) *Attorney, Agent, or Firm* — Jacox, Meckstroth & Jenkins

(57) ABSTRACT

A rotor core for an electric motor includes a stack of laminations having peripherally spaced openings receiving copper bars with opposite end portions projecting from the stack. The core is mounted on an arbor and is inserted into a mold on a vertical die cast press having a shot chamber. The mold has upper and lower mold members defining annular cavities receiving end portions of the bars. Molten copper or aluminum is poured into the shot chamber and forced upwardly by a shot piston through passages in the lower mold member and into the cavity around the lower end portions of the bars. The pressurized molten metal solidifies and shrinks around the bar end portions to form an endring for the rotor. The core, endring and arbor are inverted and confined in the mold, and the casting steps are repeated to form the opposite endring.

7 Claims, 2 Drawing Sheets

PRODUCTION OF DIE CAST ROTORS WITH COPPER BARS FOR ELECTRIC MOTORS

BACKGROUND OF THE INVENTION

This invention relates to the production of die cast rotors for electric motors and which uses a vertical die cast press and metal heating and transfer apparatus or system as disclosed in U.S. Pat. No. 5,332,026 which issued to the assignee of the present invention and the disclosure of which is herein incorporated by reference. As disclosed in the patent, an electric motor rotor includes a stack of metal laminations mounted on a cylindrical arbor, and the laminations have peripherally spaced slots which extend between an annular cavity within an upper mold member and an annular cavity within a lower mold member. Molten copper material is poured into a shot cavity or chamber of the press, and the molten material is forced upwardly by the shot piston through sprue passages within the lower mold member. The molten material fills the lower cavity to form one endring for the rotor, and the molten material continues to flow upwardly through the slots in the laminations and into the upper cavity to form the opposite endring and copper bars which integrally connect the upper and lower endrings.

It has been found that if the molten copper material is not precisely prepared and/or is not at the proper temperature, the cast bars within the laminations and connecting the endrings may have defects, such as porosity, which reduces the performance of the rotor. If the defects in the cast copper bars and endrings are significant, the rotor must be scrapped, which significantly increases the production costs for the rotors which are acceptable.

Motor rotors have been constructed with the use of extruded copper bars inserted into the peripheral spaced slots or openings within the laminations, and preformed endrings have been brazed to the projecting end portions of the copper bars, for example, as disclosed in U.S. Pat. Nos. 5,398,404 and 6,345,433. Rotor endrings have also been formed by spraying molten copper plasma into cavities formed around the end portions of the bars projecting from the rotor laminations, for example, as disclosed in U.S. Pat. No. 5,185,918. Other various methods of joining preformed endrings to projecting end portions of the bars are disclosed in U.S. Pat. Nos. 4,131,990, 6,088,906 and 6,877,210.

SUMMARY OF THE INVENTION

The present invention is directed to an improved method and system for efficiently producing die cast copper rotors and which substantially eliminates the forming of defects in the rotors, for example by forming copper or aluminum endrings without porosity and by forming a tight shrink-fit of each endring around projecting end portions of copper bars. The method and system of the invention are also ideally suited for efficiently producing large copper bar rotors at a significantly reduced cost.

In accordance with the invention, an electric motor rotor is produced by forming a stack of annular metal rotor laminations having peripherally spaced openings through which extruded copper bars extend with the bars having opposite end portions projecting from the stack of laminations to form a rotor core. The core is mounted on an arbor, and the assembly is inserted into a mold on a vertical die cast press having a hydraulically actuated shot piston within a shot sleeve for defining a shot chamber above the piston. The mold has upper and lower mold plates or members each defining an annular cavity which receives the end portions of the bars. After molten copper or aluminum metal is poured into the shot chamber, the mold is moved into a position above the shot chamber and is pressed downwardly against the shot sleeve. The molten metal is forced upwardly through circumferentially spaced sprue passages within the lower mold member to fill the annular cavity within the lower mold member, and the high pressure compresses the molten metal around the downwardly projecting end portions of the copper bars. The pressurized metal in the cavity solidifies and shrink-fits around the end portions of the bars to form an endring. The downward pressure on the mold is released, the mold is opened, and the assembly of the core, arbor and one endring is inverted and confined within the mold. The above casting steps are then repeated to form the opposite endring on the rotor.

Other features and advantages of the invention will be apparent from the following description, the accompanying drawings and the appended claims.

DESCRIPTION OF THE PREFERRED EMBODIMENT

Figure 1:
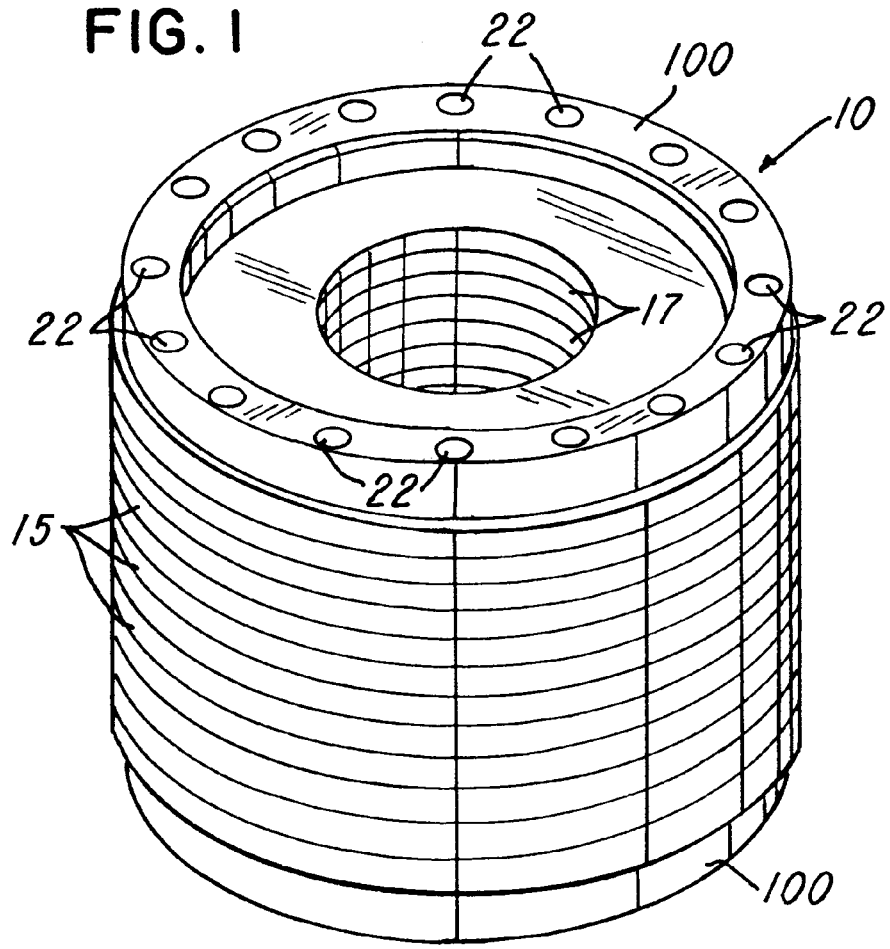
FIG. 1 is a perspective view of a rotor for an electric motor and constructed in accordance with the invention.

FIG. 1 illustrates an electric motor rotor 10 without a rotor shaft and constructed in accordance with the invention. The rotor 10 includes a rotor core 12 comprising a stack of annular ferrous metal laminations 15 which have axially aligned center openings or holes 17 and peripherally spaced aligned holes or openings 18 (FIG. 2) through which extend corresponding extruded solid copper bars 20. Each of the bars 20 has opposite end portions 22 which project from the corresponding opposite ends of the stack of laminations 15, and each end portion 22 of each bar has a cavity 24 such as a peripherally extending groove or cross hole. For simplification, the bars 20 are shown as solid cylindrical rods, however, the bars 20 may have any desired cross-sectional configuration.

Figure 3:
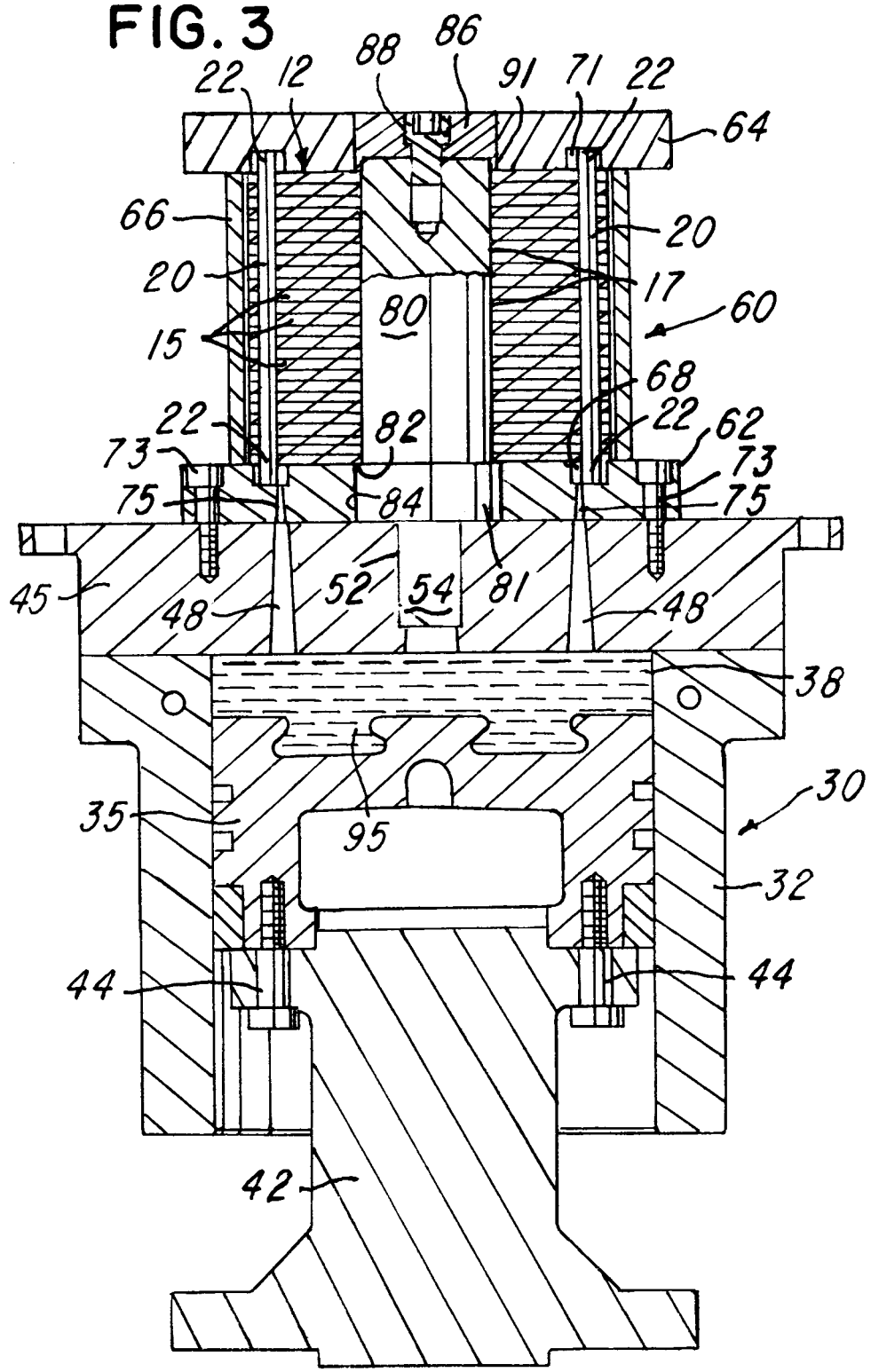
FIG. 3 is a vertical axial section through an upper portion of a vertical die cast press and through a mold enclosing the rotor core which is mounted on an arbor and prior to pressure casting an endring for the core.

The rotor 10 is efficiently produced in accordance with the invention using a vertical die cast press and metal heating and transfer mechanisms as disclosed in above-mentioned U.S. Pat. No. 5,332,026 which is herein incorporated for detail construction of the press and mechanisms. FIG. 3 of the present application illustrates an intermediate portion of a vertical die cast press 30 which includes a shot enclosure or sleeve 32 supporting a shot piston 35 for vertical movement within a shot cavity or chamber 38. The shot piston 35 is mounted on a shot piston extension 42 secured to the top end of the piston of a double-acting hydraulic cylinder, as shown in the above '026 Patent. The shot piston 35 is secured to the piston extension 42 by peripherally spaced machine screws 44, and both the shot sleeve 32 and shot piston extension 42 are provided with coolant passages which provide for precisely controlling the temperature of the shot piston 35 and shot sleeve 32.

Figure 2:
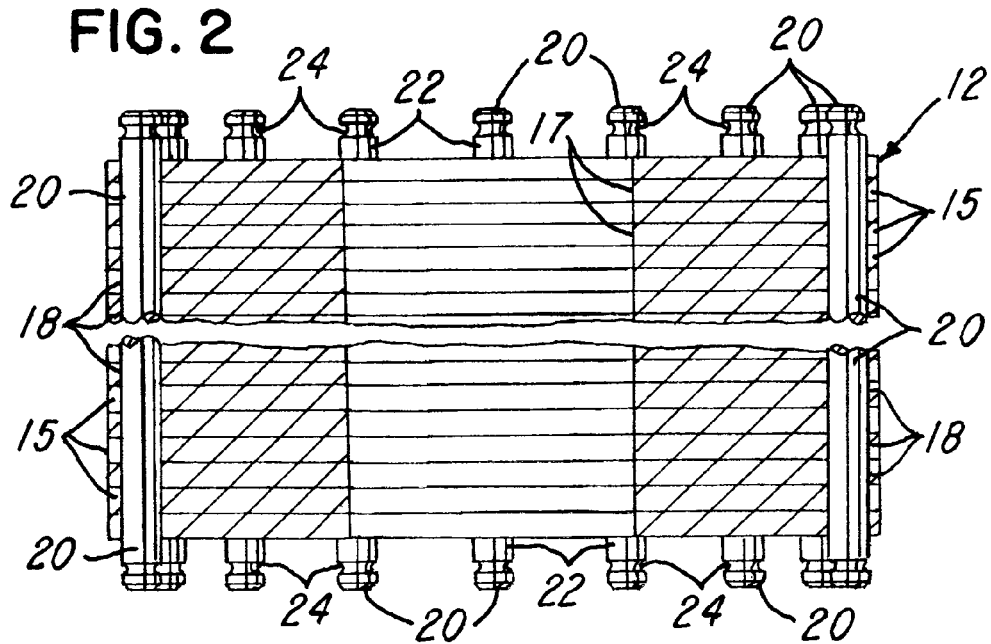
FIG. 2 is a vertical axial section of a rotor core used to produce the rotor shown in FIG. 1 and with a horizontal center portion broken away to illustrate an indefinite axial length.

A horizontal gate member or plate 45 is supported for lateral or horizontal movement between a casting position (FIG. 3) covering the shot sleeve 32 and a laterally positioned ejecting position, as shown in FIGS. 1 & 2 of the above '026 Patent. The gate plate 45 has circumferentially spaced tapered gate passages 48 and a center counterbore 52 which receives and retains an ejector pin 54.

A casting mold 60 is mounted on top of the gate plate 45 for lateral movement with the gate plate and includes a lower mold member or plate 62 and an upper mold member or plate 64 between which extends a cylindrical casting sleeve 66. The lower mold plate 62 has an upwardly facing annular groove or cavity 68, and the upper mold plate 64 has a downwardly facing annular groove or cavity 71. The lower mold plate 62 is secured to the top surface of the gate plate 45 by peripherally spaced machine screws 73 or clamps and also defines a series of circumferentially spaced tapered sprue passages 75 which connect the annular cavity 68 to the upper ends of corresponding tapered gate passages 48 within the gate plate 45.

The mold 60 also encloses a cylindrical center arbor 80 having an enlarged cylindrical lower portion 81 forming an outwardly projecting shoulder 82 and removably supported within a cylindrical center bore 84 within the lower mold plate 62. A cylindrical cap member 86 is the same size as the lower portion 81 of the arbor 80 and is removably secured to the upper end of the arbor 80 by a cap machine screw 88. The cap member 86 has a downwardly projecting peripheral skirt portion 91 which surrounds the upper end portion of the arbor 80.

In the production of the rotor 10 shown in FIG. 1, a rotor core 12, as shown in FIG. 2, is mounted on the arbor 80, and the cap member 86 is secured to the arbor by the screw 88 in order to compress the stack of laminations 15 between the shoulder 82 on the arbor 80 and the skirt 91 on the cap member 86. With the upper mold plate 64 removed from the mold 60, the core 12 and arbor 80 assembly are inserted into the mold with the inner surface of the casting sleeve 66 closely surrounding the outer surfaces of the laminations 15. As also shown in FIG. 3, the lower end portions 22 of the copper bars 20 project into the annular cavity 68. The upper mold plate 64 is installed on the upper end of the sleeve 66, and the upper end portions 22 of the bars 20 project into the annular cavity 71 within the upper mold plate.

While the assembly of the gate plate 45, mold 60 and core 12 is positioned laterally from the shot sleeve 32, molten copper or aluminum material 95, for example, 6101 aluminum alloy, is transferred into the shot cavity or chamber 38 by a transfer mechanism such as the mechanism 25 disclosed in above '026 Patent and while the shot piston 35 is located in its retracted downward position. The assembly of the gate plate 45, mold 60 and rotor core 12 is then transferred laterally to the injecting position (FIG. 3) after which the mold 60 and gate plate 45 are compressed downwardly against the shot sleeve 32 by a hydraulic cylinder and ram, such as the hydraulic cylinder 45 and ram 46 disclosed in the '026 Patent.

When the shot piston 35 is forced upwardly by the hydraulic cylinder acting on the shot piston extension 42, the molten copper or aluminum material 95 is forced upwardly with substantial pressure through the gate passages 48 and through the sprue passages 75 and into the annular cavity 68 within the lower mold plate 62 so that the molten material flows quickly around the cavity and around the lower end portions 22 of the copper bars 20. The substantial pressure on the molten copper or aluminum material also causes the material to fill all of the cavities 24 within the lower end portions 22 of the bars 20. The pressure is maintained until the molten material solidifies and shrinks tightly around the lower end portions 22 of the copper bars. The cooling may be assisted by the circulation of cooling fluid within cooling passages within the lower mold plate 62 and gate plate 45. After the material solidifies and shrinks, the material forms a solid copper or aluminum endring 100 (FIG. 1) on the lower end of the rotor 10.

After forming one endring 100 on the rotor 10, the downward pressure on the mold 60 is released, and the gate plate 45 and mold 60 are shifted laterally to an ejecting station such as the ejecting station 94 disclosed in the '026 Patent. At the ejecting station, the upper mold plate 64 is removed, and a hydraulically actuated ejecting piston at the station engages the ejecting pin 54 within the gate plate 45 and presses the assembly of the arbor 80, cap member 86, stack of laminations 15 and lower endring 100 upwardly within the casting sleeve 66. The assembly of the rotor 12 with one endring 100 and the arbor 80, is then turned over or inverted and inserted back into the mold sleeve 66 so that the opposite end portions 22 of the bars 20 project into the annular cavity 68 within the lower mold plate 62. The above casting steps are then repeated to form the opposite endring 100 on the rotor 10.

After the copper or aluminum material solidifies within the shot chamber 38 and within the gate passages 48 and sprue passages 75 after forming each endring 100, the shot piston 35 is retracted downwardly by its hydraulic cylinder so that the solidified material is retracted from the tapered passages 48 and 75 and projects upwardly from the solidified material within the shot chamber 38 to form a solidified "biscuit". After the gate plate 45 and mold 60 are transferred or shift laterally to the ejecting and removal station, the shot piston 35 is elevated to a position where the solidified material, forming the biscuit, is ejected laterally from the shot piston, in a conventional manner.

After the gate plate 45, mold 60 and core 10 with both endrings 100, are transferred as a unit to the ejecting and removal station, the upper mold plate 64 is removed, and the rotor 10 is removed or ejected upwardly with the arbor 80 by a hydraulically activated ejector rod such as the rod 134 disclosed in the '026 Patent. The cap member 86 is removed, and the rotor 10 with pressure cast copper or aluminum endrings 100 is removed from the arbor 80.

From the drawings and the above description, it is apparent that a die cast rotor produced in accordance with the invention provides desirable features and advantages. More specifically, the method and apparatus of the invention provide for optimizing the mechanical and electrical connection between the copper bars within the laminations and each endring and provides for minimizing the copper or aluminum in each endring. The electrical connection is a significant improvement over the prior connection produced by brazing or crimping precast endrings to end portions of the copper bars within the laminations. As a result, the method and apparatus of the invention are ideally suited for producing large rotors such as rotors having a diameter over twelve inches, for example, as used in motors on train locomotives and oil rigs. The center arbor 80 and arbor cap 86 also hold or clamp the laminations 15 in the stack while separately casting each endring, and the casting cycle is reduced since only the endrings are cast. It should also to be understood that the gate plate 45 may be constructed larger for supporting a plurality of molds 60 and be transferred or indexed in order to increase production of the rotors. Also, the upper mold plate 64 could be made like the lower mold plate 62 with sprue passages 75 and the mold plates could be secured by releasable clamps so that after one endring is formed, the mold plate is released from the gate plate and then the entire mold is inverted for forming the opposite endring.

While the method and form of apparatus herein described constitute a preferred embodiment of the invention, it is to be understood that the invention is not limited to the precise method and form of apparatus described, and that changes made therein without departing from the scope and spirit of the invention as defined in the appended claims.

What is claimed is:

1. A method of forming an endring on each end of an electric motor rotor core having a stack of metal laminations with a plurality of copper bars extending through peripherally spaced aligned openings within the laminations and with the bars having opposite end portions projecting from opposite ends of the stack of laminations, the method comprising the steps of positioning the stack of laminations and bars within a mold having an upper mold member and a lower mold member with each mold member having an annular cavity receiving end portions of the bars projecting from the stack of laminations, forming circumferentially spaced sprue passages within the lower mold member and extending the sprue passages upwardly to the annular cavity within the lower mold member, positioning the mold adjacent a vertical die cast press having a hydraulically actuated shot piston within a shot sleeve to define a shot chamber, placing a first charge of molten metal into the shot chamber and positioning the mold above the shot sleeve and shot chamber, moving the shot piston upwardly with a hydraulic cylinder to force the molten metal upwardly through the sprue passages and into the annular cavity within the lower mold member and around the projecting end portions of the bars within the cavity, allowing the molten metal to solidify and shrink around the projecting end portions of the bars to form a first solid endring electrically connecting the bars, inverting the assembly of the stack of laminations, copper bars and first endring, with the assembly confined within the mold, placing a second charge of molten metal into the shot chamber and positioning the mold above the shot sleeve and shot chamber, moving the shot piston upwardly with the hydraulic cylinder to force the molten metal upwardly through the sprue passages and into the annular cavity within the lower mold member and around the projecting end portions of the bars within the cavity, allowing the molten metal to solidify and shrink around the projecting end portions of the bars to form a second solid endring electrically connecting the bars, and removing the assembly of the stack of laminations, copper bars, first endring and second endring from the mold.

2. A method as defined in claim 1 and including the step of positioning a vertical arbor within axially aligned center holes within the stack of laminations, securing a removable cap member to the arbor, and clamping the stack of laminations axially with the arbor and cap member while the assembly is in the mold.

3. A method as defined in claim 1 and including the step of surrounding the stack of laminations within the mold with a casting sleeve forming part of the mold and having a cylindrical inner surface closely surrounding the stack of laminations and with the sleeve extending between the upper mold member and the lower mold member.

4. A method as defined in claim 1 and including the step of forming peripheral recesses within the end portions of the copper bars to interlock the copper bars with each metal endring and to increase the electrical connection between the bars and the endring.

5. A method as defined in claim 1 and including the step of positioning a gate plate between the lower mold member and the shot sleeve, and forming within the gate plate tapered passages connecting the sprue passages to the shot chamber.

6. A method as defined in claim 1 wherein the first charge and the second charge of molten metal placed into the shot chamber comprise copper to form a copper first endring and a copper second endring.

7. A method as defined in claim 1 wherein the first charge and the second charge of molten metal placed into the shot chamber comprise aluminum to form a first aluminum endring and an aluminum second endring.

* * * * *